No. 610,266. Patented Sept. 6, 1898.
P. E. ERICKSON.
SAW SET AND SHARPENER.
(Application filed Mar. 24, 1898.)
(No Model.)
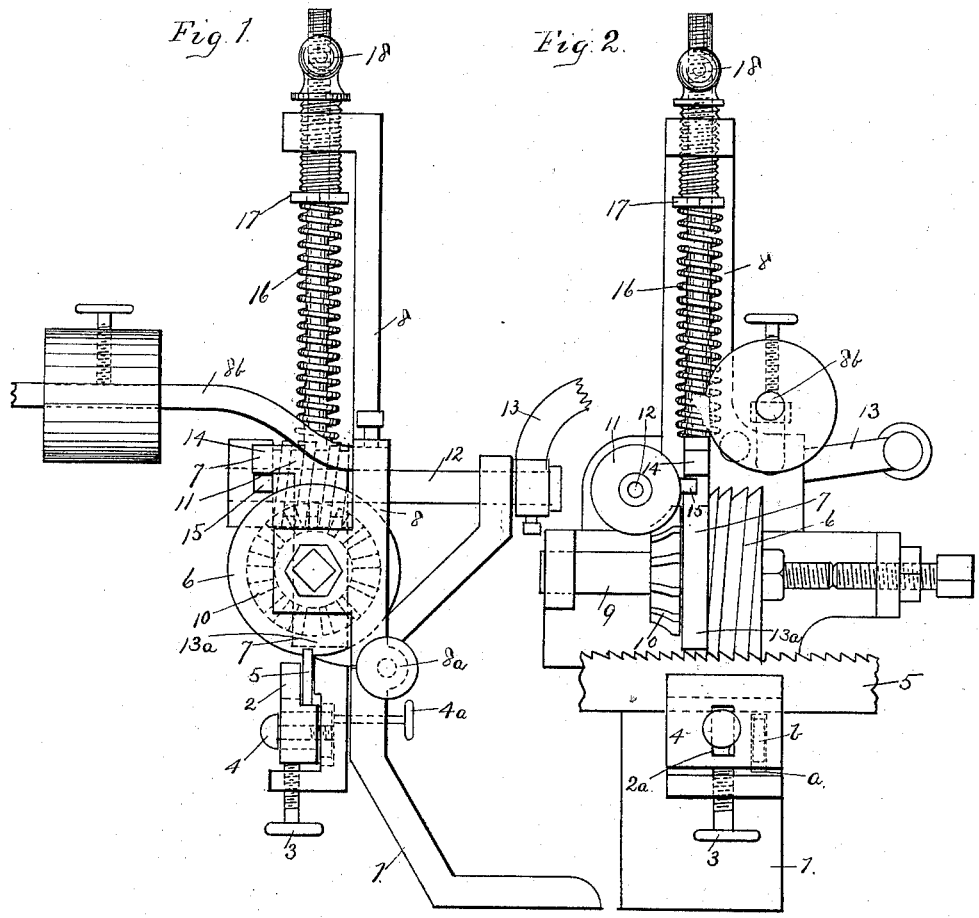
WITNESSES
INVENTOR
Peter E. Erickson
BY
Edgar Tate & Co.
ATTORNEYS

UNITED STATES PATENT OFFICE.

PETER ERICK ERICKSON, OF PORT CHESTER, NEW YORK, ASSIGNOR OF ONE-HALF TO JOHN WILLIAM CZERMAK, OF SAME PLACE.

SAW SET AND SHARPENER.

SPECIFICATION forming part of Letters Patent No. 610,266, dated September 6, 1898.

Application filed March 24, 1898. Serial No. 675,004. (No model.)

*To all whom it may concern:*

Be it known that I, PETER ERICK ERICKSON, a citizen of the United States, residing at Port Chester, in the county of Westchester and State of New York, have invented certain new and useful Improvements in Saw Sets and Sharpeners, of which the following is a full and complete specification, such as will enable those skilled in the art to which it appertains to make and use the same.

This invention relates to devices for setting and sharpening the teeth of a saw and to that class thereof known as "hack-saws," particularly adapted for use in cutting or sawing metal; and the object of the invention is to provide an improved device of this class which will operate to simultaneously sharpen and set the saw.

The invention consists in the features of construction and combination of parts hereinafter fully described and specifically claimed.

The invention is fully disclosed in the following specification, of which the accompanying drawings form a part, in which the separate parts of my improvement are designated by the same letters and numerals of reference in each of the views, and in which—

Figure 1 is a side elevation of an apparatus constructed in accordance with this invention. Fig. 2 is a side elevation taken at a right angle to Fig. 1, and Fig. 3 is a detail of the cutter and feed block on an enlarged scale.

In said drawings, 1 indicates a base that may be attached to a table, bench, or any suitable support. Said base is provided at one side with a saw guide and clamp, conveniently consisting of a clamping-plate 2 and the adjusting and clamping screws 3, 4, and $4^a$, said clamping-plate having a slot $2^a$, through which the screw 4 passes, the screw $4^a$ serving to move the plate away from the base and the screw 3 serving to adjust it vertically. The face of the base is also provided with an upright groove $a$, in which fits a rib $b$ on the rear side of the clamping-plate, and thus the clamping-plate is held against displacement.

A saw 5 is shown as being acted upon by the sharpening and teeth-setting devices, which comprises a rotatable cutter and feed block 6 and a plunger 7. Said block 6 is rotatably mounted in bearing-arms projecting from a standard 8 by means of a shaft 9, upon which it is rigidly mounted, while at one side said shaft is provided with a worm-wheel 10. The said standard 8 is hinged to the base, as shown at $8^a$, so that the entire operative parts of the device can be thrown to one side and away from the saw being acted upon. The standard carries an arm $8^b$, having an adjustable weight, and by means of which the upper hinged part is held in operative position and under yielding pressure. The said parts are rotated by means of a worm 11, carried by a shaft 12, having a crank 13. The said cutter and feed block is provided with a spiral cutting-groove that is milled for the purpose of cutting the saw-teeth, while it is obvious that the spiral groove also advances or feeds the saw by reason of its engagement with the teeth. The said block of course can be divided into cutting and feed sections by milling only a portion of the same.

The plunger 7 is guided in suitable guides on the standard 8 and carries a head $13^a$ at its lower end to engage and set the saw-teeth. Movement is imparted to the said plunger by a projection 14 thereon, that is situated on the path of a lug 15 upon the shaft 12, whereby the said plunger is raised. The downward and active movement thereof is caused by a spring 16, encircling the plunger and bearing at its opposite ends against the head of the standard 8, and the lower end of an adjusting-collar 17, that passes through a screw-threaded opening in the upper end of the standard. The upper screw-threaded end of the plunger passes through the collar 17 and carries a nut 18, by means of which the extent of movement of the plunger can be regulated, said collar serving to regulate the tension of the spring 16.

In operation the upper part of the device is first thrown to one side, so that the saw 5 can be placed within the socket formed by the clamping-plate. The cutter shown in Figs. 1 and 2 is milled or presents a filing edge which fits the teeth of the saw, and being arranged in a spiral conformation of the cutting-ribs of the cutter serves to feed the saw along while it is sharpening the same. The saw-setting arrangement acts upon the teeth before they are treated by the cutter, and in operation it is seen that the rotation of the shaft will turn the cutter by reason of the worm and worm-wheel gear between said parts; and, furthermore, the plunger is raised by the lugs 15 of the shaft, and for every rotation of said shaft there is a vibration on the part of the saw-setting plunger.

This device is intended for use in connection with hack-saws for cutting metal and for similar purposes, and the end of the plunger does not set the teeth in the manner of an ordinary saw-setter, but simply flattens or blunts them, and said end of the plunger is therefore provided with a plain under surface. The walls of the spiral groove in the rotatable cylinder which operates as a sharpener and feeder are set one at a right angle to the face of the cylinder and the other substantially at an angle of forty-five degrees, and both the walls of said grooves are provided with cutting-faces similar to those of a file, and by means of this construction the saw is continuously and evenly fed through the machine and the teeth sharpened.

Having fully described my invention, what I claim, and desire to secure by Letters Patent, is—

1. In a saw-sharpener the base having an upright groove on one of its side faces, a clamping-plate having a rib fitting within said groove, an upright slot in said clamping-plate, an adjustable screw passing through said slot and into the base, an adjusting-screw carried by the base and engaging the lower end of said clamping-plate, and an adjusting-screw passing through said face and engaging the rear face of said clamping-plate.

2. A device of the character herein described, comprising a suitable base, an upright connected with said base, a saw-carrier connected with said upright in which the saw is adapted to move, a frame hinged to said upright, a rotatable cylindrical sharpener and feeder mounted in said frame and provided with a spiral groove the walls of which are provided with file-surfaces, a vertically-movable spring-depressed plunger mounted in front of said sharpener and feeder, and adapted to set the teeth of the saw, and means for raising said plunger and rotating said cylinder, substantially as shown and described.

3. A device of the character herein described, comprising a suitable base, an upright connected with said base, a saw-carrier connected with said upright in which the saw is adapted to move, a frame hinged to said upright, a rotatable cylindrical sharpener and feeder mounted in said frame and provided with a spiral groove the walls of which are provided with file-surfaces, a vertically-movable spring-depressed plunger mounted in front of said sharpener and feeder and adapted to set the teeth of the saw, and means for raising said plunger and rotating said cylinder, comprising a crank-shaft mounted transversely of the shaft of the sharpener and feeder and provided with a worm-gear which operates in connection with a corresponding gear on the shaft of the sharpener and feeder, and said crank-shaft being also provided with a shoulder or projection which operates in connection with a corresponding shoulder or projection on the plunger, substantially as shown and described.

4. A device of the character herein described, comprising a suitable support, a saw-carrier connected therewith, a frame hinged to said support and provided with a weighted arm, a rotatable saw sharpener and feeder mounted in said support, a vertically-movable spring-depressed plunger mounted in front of said sharpener and feeder, and means for raising said plunger and rotating said sharpener and feeder, substantially as shown and described.

In testimony that I claim the foregoing as my invention I have signed my name, in presence of the subscribing witnesses, this 22d day of March, 1898.

PETER ERICK ERICKSON.

Witnesses:
FRED HUBE,
JOHN C. HALPIN.